(12) United States Patent
Bailiang

(10) Patent No.: US 9,443,447 B2
(45) Date of Patent: Sep. 13, 2016

(54) SYSTEM AND METHOD FOR DISPLAYING REAL-TIME FLIGHT INFORMATION ON AN AIRPORT MAP

(75) Inventor: Zhou Bailiang, Balgowlah (AU)

(73) Assignee: GOOGLE INC., Mountain View, CA (US)

( * ) Notice: Subject to any disclaimer, the term of this patent is extended or adjusted under 35 U.S.C. 154(b) by 448 days.

(21) Appl. No.: 13/608,589

(22) Filed: Sep. 10, 2012

(65) Prior Publication Data
US 2015/0187232 A1    Jul. 2, 2015

Related U.S. Application Data

(60) Provisional application No. 61/678,049, filed on Jul. 31, 2012.

(51) Int. Cl.
*G08G 1/123* (2006.01)
*G09B 29/00* (2006.01)

(52) U.S. Cl.
CPC .................................. *G09B 29/007* (2013.01)

(58) Field of Classification Search
None
See application file for complete search history.

(56) References Cited

U.S. PATENT DOCUMENTS

| | | | |
|---|---|---|---|
| 5,414,809 A * | 5/1995 | Hogan et al. | 715/765 |
| 7,603,281 B1 * | 10/2009 | Miller et al. | 705/1.1 |
| 2002/0006788 A1 * | 1/2002 | Knutsson et al. | 455/422 |
| 2004/0225432 A1 * | 11/2004 | Pilley et al. | 701/117 |
| 2006/0059024 A1 * | 3/2006 | Bailey et al. | 705/5 |
| 2008/0030300 A1 * | 2/2008 | Naito et al. | 340/5.1 |
| 2010/0190510 A1 * | 7/2010 | Maranhas et al. | 455/456.1 |
| 2011/0133892 A1 * | 6/2011 | Nohr | 340/10.1 |
| 2011/0288768 A1 * | 11/2011 | Stefani et al. | 701/201 |
| 2014/0018112 A1 * | 1/2014 | Cohen-Zur | H04W 4/04 455/457 |

OTHER PUBLICATIONS

FlightAware, "Live Flight Tracking: Flight Tracker," (2012). Retrieved from the Internet on Jul. 31, 2012: URL:http://flightaware.com/live/airport/KORD.
FlightAware, "Live Flight Tracking: Map & Diagram," (2012). Retrieved from the Internet on Jul. 31, 2012: URL:http://flightaware.com/resources/airport/KORD/map.
FlightStats, "Airport Tracker: Airports," (2012). Retrieved from the Internet on Jul. 31, 2012: URL:http://www.flightstats.com/go/AirportTracker/airportTracker.do?airport=%28ORD%29+O%27Hare+Intl%2C+Chicago%2C+IL%2C+US&x=29&y=7.
FlightStats, "Interactive Map: Terminal Info," (2012). Retrieved from the Internet on Jul. 31, 2012: URL:http://www.flightstats.com/go/AirportTerminalMaps/interactiveMap.do?airportCode=ORD.
FlightView®, "Airport Tracker: Airport Delays," (2012). Retrieved from the Internet on Jul. 31, 2012: URL:http://www.flightview.com/TravelTools/ViewAirport.asp?airport=ORD.

(Continued)

*Primary Examiner* — Brian Zimmerman
*Assistant Examiner* — Kevin Lau
(74) *Attorney, Agent, or Firm* — Marshall, Gerstein & Borun LLP

(57) ABSTRACT

A digital map of an airport is displayed via the user interface of a client device, and real-time flight information of a flight scheduled to depart from, or arrive at, an airport is obtained. An airport facility with which the real-time flight information is associated is determined, and the real-time flight information is displayed at a location on the digital map corresponding to the determined airport facility.

20 Claims, 7 Drawing Sheets

(56) References Cited

OTHER PUBLICATIONS

Navteq Traffic.com, "Traffic Alerts and Reports," (2012). Retrieved from the Internet on Jul. 31, 2012: URL:http://www.traffic.com/controller/routing?nvt_pointA=60606&nvt_pointB=60606.

Yelp, "Restaurant Chicago," (2004-2012). Retrieved from the Internet on Jul. 31, 2012: URL:http://www.yelp.com/search?find_desc=restaurant&find_loc=60647&ns=1#find_loc=60606.

* cited by examiner

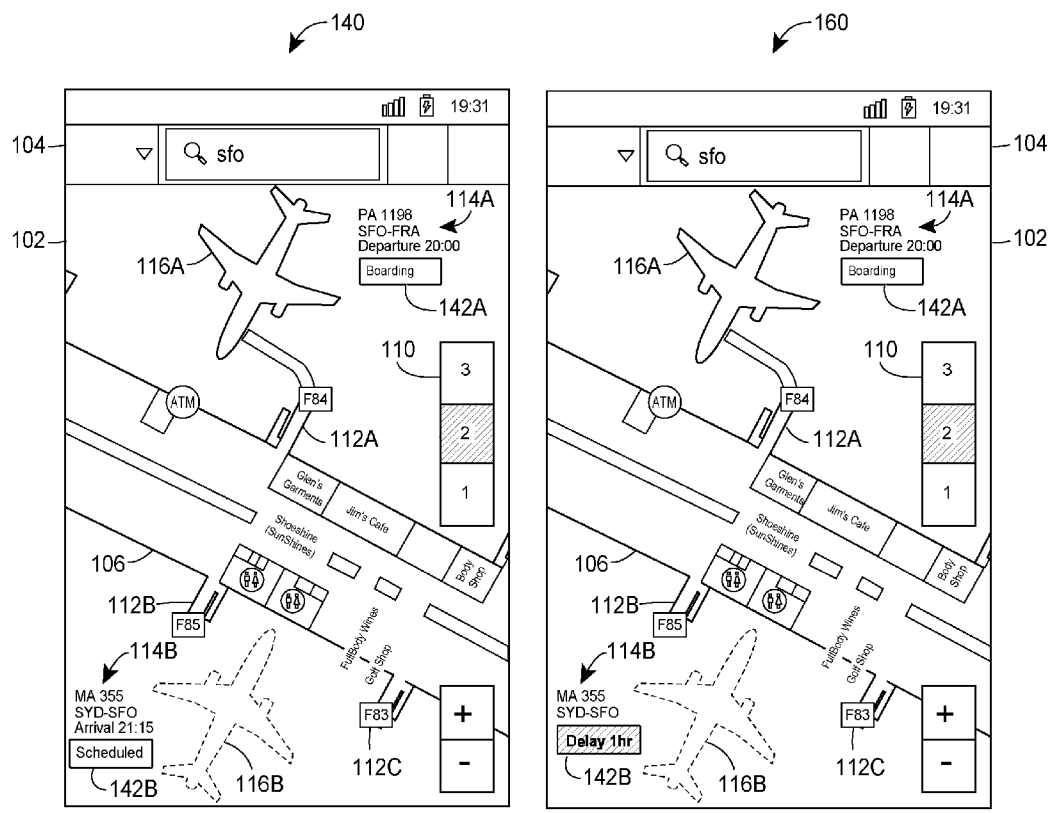
FIG. 4A  FIG. 4B

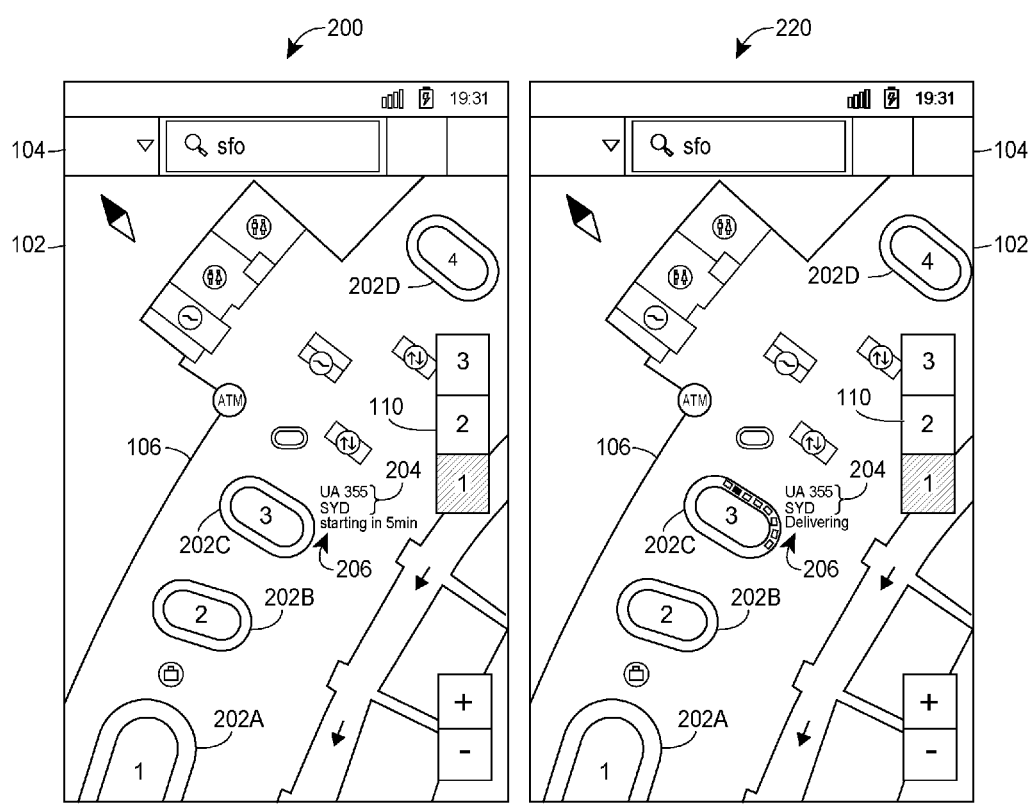
FIG. 5A          FIG. 5B

SYSTEM AND METHOD FOR DISPLAYING REAL-TIME FLIGHT INFORMATION ON AN AIRPORT MAP

CROSS-REFERENCE TO RELATED APPLICATION

This application claims priority to U.S. Provisional Patent Application No. 61/678,049, filed on Jul. 31, 2012 and entitled "System and Method for Displaying Real-Time Flight Information on an Airport Map," the entire disclosure of which is hereby expressly incorporated by reference herein.

FIELD OF THE DISCLOSURE

The present disclosure relates to providing real-time flight information and, more particularly, to displaying real-time flight information on a map of an airport.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, various computing devices support software applications that provide interactive, digital maps ("mapping applications"). Mapping applications may include various types of geographic data, such as topographical data and street data, for example. The geographic data may be schematic-based, and/or photography-based as in the case of satellite imagery. Users may interact with a displayed map using viewing functions such as pan or zoom, or by entering location information such as a street address. Moreover, various portable computing devices, such as mobile phones and hand-held global positioning system (GPS) units, currently support software applications that provide navigation functions ("navigating applications"). Navigation applications typically provide a current location of the device user (via a locating technique such as GPS, cellular tower triangulation, or WiFi access point triangulation, for example), which is shown to the user on a digital map of the relevant geographic area. In this manner, navigation applications provide information relevant to a user's immediate surroundings. For example, a user running a navigation application on a portable device while in or near an airport may be automatically provided with a map display that includes a "footprint" of the airport (e.g., a schematic representation and/or satellite photograph that shows the airport terminal building(s), runway(s), etc.), and possibly the name of the airport. However, other information likely to be of particular interest to airport visitors, such as flight information for flights arriving at or departing from the airport, is not provided. Instead, a user seeking information for a particular flight, such as a flight number, a departure/arrival time, flight status, etc., typically must obtain the information by telephone, visiting a web site (e.g., an airline web site) and entering search information identifying the flight, visiting a physical help desk within the airport, and/or locating a Flight Information Display System (FIDS) display within the airport.

SUMMARY

One embodiment of the techniques described below is a method for displaying real-time flight information on a user interface of a client device. The method includes displaying a digital map of an airport via the user interface, obtaining real-time flight information of a flight scheduled to depart from, or arrive at, the airport, determining an airport facility with which the real-time flight information is associated, and displaying the real-time flight information at a location on the digital map corresponding to the determined airport facility.

In another embodiment, a computer-readable medium stores instructions for displaying real-time flight information on a user interface of a client device. When executed on one or more processors of a computing device, the instructions cause the computing device to display a digital map of an airport via the user interface, obtain real-time flight information of a flight scheduled to depart from, or arrive at, the airport, determine an airport facility with which the real-time flight information is associated, and display the real-time flight information at a location on the digital map corresponding to the determined airport facility.

In yet another embodiment, a method for displaying real-time flight information on a user interface of a client device includes receiving map data representing a digital map. The digital map includes a visual representation of an airport facility within an airport. The method also includes receiving an indication that a map element on the digital map corresponding to the airport facility is associated with flight information, receiving flight data representing real-time flight information of a flight scheduled to utilize the airport facility, displaying the digital map, via the user interface, based on the received map data, and displaying the real-time flight information, via the user interface and based on the received indication and the received flight data, at a location on the digital map corresponding to the map element.

In still another embodiment, a method for providing client devices with information for displaying real-time flight information includes receiving a query from a client device, and retrieving map data representing a digital map in response to the query from the client device. The digital map includes a visual representation of an airport. The method also includes causing (i) the map data, and (ii) an indication that a map element corresponding to an airport facility on the digital map is associated with flight information, to be transmitted to the client device. The method is implemented on a server that communicates with the client device via a network.

BRIEF DESCRIPTION OF THE DRAWINGS

FIGS. 4A-4C are example screenshots that illustrate the display of real-time flight information, including a current status of each flight, on an indoor map showing terminal gates of an airport;

FIGS. 5A-5B are example screenshots that illustrate the display of real-time flight information on an indoor map showing a baggage claim area of an airport;

DETAILED DESCRIPTION

Figure 1:
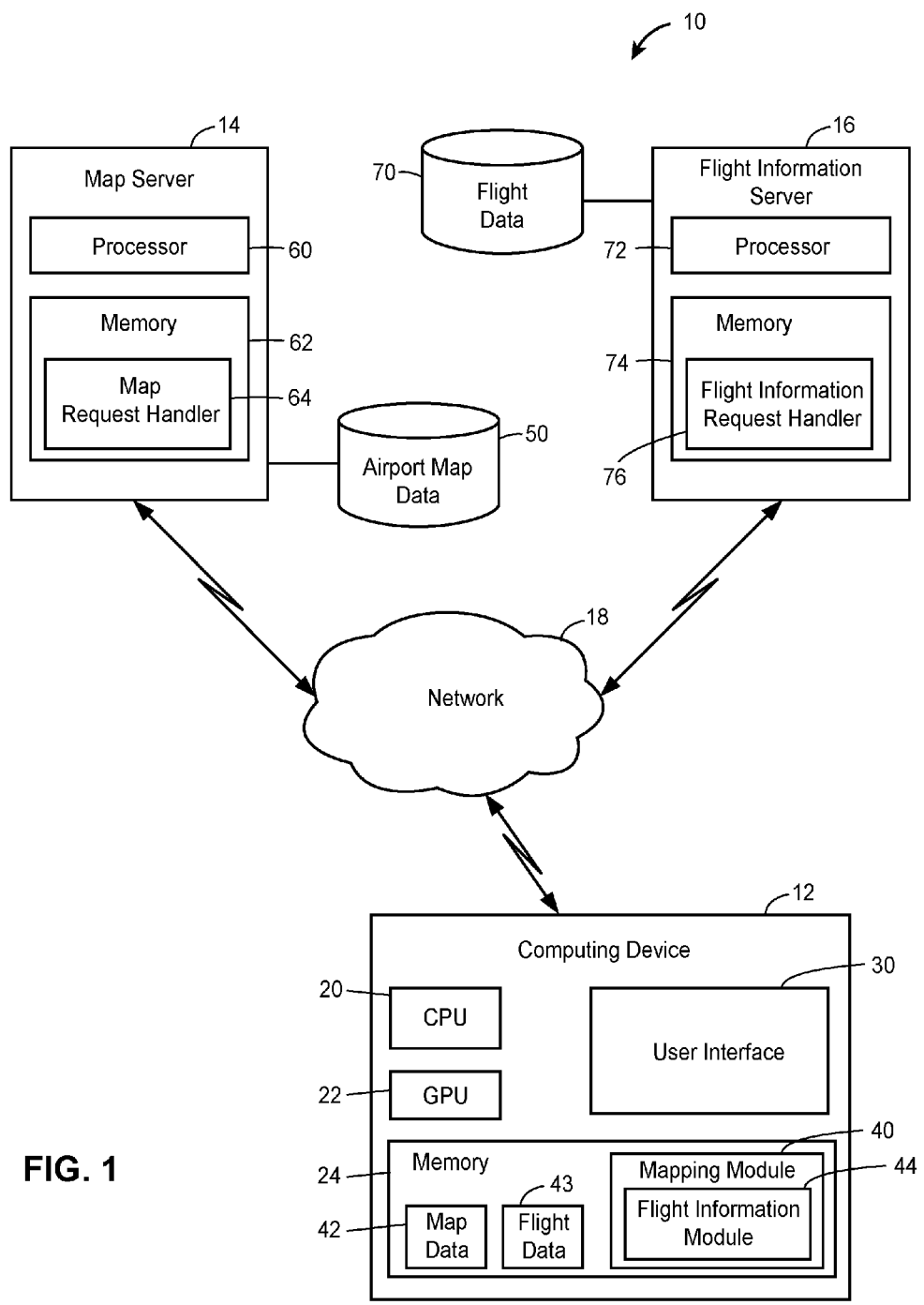
FIG. 1 is a block diagram of an example system in which techniques for providing real-time flight information on an airport map are implemented.

A mapping software module operating on a computing device displays a digital map of an airport. The map may include a satellite photograph of an exterior of the airport terminal building (e.g., runways, roof of the terminal building, etc.), a schematic representation of the exterior of the terminal building, and/or a schematic representation of the interior of the terminal building, for example. The mapping software module overlays the airport map with a display of real-time flight information, such as flight number, airline, and/or departure/arrival time. As used herein, the phrase "real-time flight information" indicates that the flight information reflects the current scheduling associated with a flight. Flight information is understood to be "real-time" even if processing and other delays occasionally cause the flight information to differ from the most recently scheduled information for brief periods of time. The real-time flight information may be displayed at particular locations on the airport map in a manner that allows a user to quickly and intuitively understand what the information represents. For example, flight arrival information (e.g., flight number and arrival time) may be displayed on the map at a location on or near the gate at which the flight is scheduled to arrive. As another example, baggage claim information (e.g., flight number and baggage arrival time) may be displayed on the map at a location on or near the baggage claim pickup area (e.g., a carousel) at which the baggage from the flight is scheduled to be delivered.

In one example implementation, a graphic of an airplane is included next to each of one or more terminal gates shown on the airport map. The type of airplane graphic shown at a particular gate may depend on the current status of the flight scheduled to depart from or arrive at the gate. In this manner, a user may learn the current status of a flight by quickly scanning the airport map, without necessarily reading any text on the map. For example, a first airplane graphic may indicate that a departing flight is present and currently boarding, or that a flight has arrived and is unloading passengers, etc., a second airplane graphic may indicate that the next scheduled flight has not yet arrived, and a third airplane graphic may indicate that a flight previously scheduled to arrive at the gate has been cancelled. In one example implementation, each of these airplane graphics is accompanied by corresponding, textual flight information (e.g., flight number, departure or arrival time, etc.). In some implementations, no airplane icon is shown at gates that have been inactive for a certain amount of time, and/or are not scheduled to be used for a certain amount of time.

In another example implementation, a particular baggage claim graphic is shown at a baggage claim area depending on the current baggage delivery status of a flight scheduled to deliver baggage to that baggage claim area. For example, a first baggage claim graphic may indicate that baggage delivery has not yet begun, or has been completed, and a second baggage claim graphic may indicate that baggage delivery is underway. In one example implementation, each of these baggage claim graphics is accompanied by corresponding, textual flight information (e.g., flight number, arrival time, etc.).

These techniques are discussed in more detail below with reference to FIGS. 1-7. In particular, an example system in which a mapping software module may provide real-time flight information on an airport map is described with reference to FIG. 1, example screenshots provided by the mapping software module are discussed with reference to FIGS. 2-5, and example methods which the mapping software module may implement to display real-time flight information on an airport map are discussed with reference to FIGS. 6 and 7.

Referring first to FIG. 1, a system 10 includes a computing device 12 coupled to a map server 14 and a flight information server 16 via a communication network 18. The computing device 12 can be, for example, a laptop computer, a tablet computer, a smartphone, etc. In the embodiment illustrated in FIG. 1, the computing device 12 includes a central processing unit (CPU) 20, a graphics processing unit (GPU) 22, a computer-readable memory 24, and a user interface 30. In various implementations, the user interface 30 includes a touch interface (not shown in FIG. 1) such as a touch screen, or a non-touch display with keyboard and/or mouse, for example. The memory 24 is a computer-readable non-transitory storage device that may include both persistent (e.g., a hard disk) and non-persistent (e.g., RAM) memory components, and stores instructions executable on the CPU 20 and/or the GPU 22. The stored instructions make up a mapping software module 40, as well as map data 42 and flight data 43 on which the mapping module 40 operates. The mapping software module 40 may be included in, or interface with, a navigation software module (not shown in FIG. 1) within the memory 24. The mapping software module 40 includes a flight information module 44 that integrates real-time flight information into maps presented by the mapping module 40, as described further below.

The mapping software module 40 according to various implementations operates as a separately executable software application, a plugin that extends the functionality of another software application such as a web browser, an application programming interface (API) that may be invoked by a software application, etc. The instructions that make up the mapping software module 40 may be compiled and executable on the CPU 20 and/or the GPU 22 directly, or not compiled and interpreted by the CPU 20 at runtime. Further, the flight information module 44 may be provided as an integral part of the mapping software module 40 or as a separately installable and downloadable component.

Depending on the implementation, the map data 42 may be in a raster format, such as Portable Network Graphics (PNG), a vector graphics format (based on mathematical descriptions of geometric shapes), or any other suitable format. The map data 42 in some cases is divided into map tiles, or portions of a map image having a certain fixed size, such as 256 by 256 pixels. In operation, the mapping module 40 receives the map data 42 from the map server 14, renders a map image based on the map data, and causes the map image to be displayed via the user interface 30. When the map data 42 is already rasterized, the mapping module 40 renders the map image by selecting and combining the proper rasterized tiles. However, if the map data 42 is in a vector graphics format, the mapping module 40 interprets the descriptions of various shapes to generate the corresponding raster images. The mapping module 40 also adjusts the displayed image and requests new map data, when necessary, in response to user input received via the user interface 30. More specifically, the user may change the zoom level, pan across the map, select a different map type (e.g., traffic map, terrain map), and otherwise interact with the map. In implementations or scenarios where the computing device 12 runs a navigation application, the mapping module 40 may also adjust the displayed image and request new map data, when necessary, in response to the user of the computing device 12 changing his or her location.

The map server 14 may include a processor 60 and a memory 62 that stores a request processor 64, made up of instructions executable on the processor 60. The computing device 12 and the map server 14 may communicate in a client-server mode, where the computing device 12 sends requests for map data to the map server 14, and the map server 14 provides map data in response to these requests. In operation, the request processor 64 may receive requests for map data from the computing device 12, identify and retrieve the requisite map data from the map database 50 and/or other map databases, format response messages that contain the map data, and cause the response messages to be transmitted to the computing device 12 via the network 18, which may be a wide area network (WAN) such as the Internet, a local area network (LAN), or any other suitable type of a network.

In one scenario, for example, the map server 14 receives a request from computing device 12 that corresponds to a geographic area in which an airport is located, along with a zoom level and map type. The request may reflect a user command (e.g., an entry of the airport name, or a street address associated with the airport or a nearby location) when the user employs a mapping application, or may reflect the user's location (e.g., the user's location at a time when the user is in or near the airport) when the user employs a navigation application. The map server 14 in response retrieves map data, including map data representing the airport. The airport map data is included in a database 50, which may be the same database in which other map data (e.g., data for geographic areas that do not include the airport) is stored. In an alternative implementation, the database 50 is coupled to a different server, and is retrieved by map server 14 via the network 18 in response to the request from the user. In either of these implementations, the map server 14 then provides the airport map data to the computing device 12, where the airport map data is stored as a part of the map data 42.

In some implementations (e.g., where the computing device 12 runs a navigation application supporting indoor navigation), the airport map data represents an indoor map of the airport. The indoor map may depict internal features of the airport terminal building such as the layout of internal walls or dividers, locations of elevators, escalators, restrooms, etc. In addition, the indoor map may depict one or more facilities of a kind specific to airports, such as a terminal gate for boarding and unloading passengers, and/or a baggage claim (e.g., a carousel) for delivering baggage to arriving passengers. The indoor map may include text identifying various graphic components, such as names of businesses within the airport (e.g., restaurants, bookstores, etc.), gate numbers, and baggage claim numbers. When provided in a vector graphics format, the airport map data may specify individual map elements (e.g., physical entities such as exterior walls, interior walls/dividers, escalators, and elevators, as well as airport facilities such as terminal gates and baggage claim carousels), which mapping module 40 interprets in order to generate corresponding raster images. When the map data is instead provided in a raster format, the various map elements typically are embedded into the same image. For multi-level airport terminal buildings, the indoor map data may specify internal features of one level at a time. The indoor map may include a map of a level selected by a user, for example, or, if indoor navigation locating techniques can detect elevation, the level on which a user is currently located.

In other implementations, the airport map data represents an "outdoor map" of the airport. The outdoor map may include a schematic representation of the externally visible portions of the airport (e.g., an outline of the terminal building(s) and a representation of the runways), and/or satellite photographs of the externally visible portions of the airport (e.g., the roof of the terminal building(s) and the runways). As with the indoor airport map described above, the outdoor map may include text identifying various graphic components, such as gate numbers. In some implementations, the airport map data represents a hybrid indoor/outdoor map, such as a satellite photograph of the airport overlaid with various graphic and/or text components corresponding to indoor locations, such as businesses within the airport, terminal gates, baggage claim areas, etc.

In some implementations, the map server 14 sends not only the airport map data to the computing device 12, but also an indication that one or more particular locations on the corresponding airport map are associated with flight information. For example, the airport map data stored in database 50 and sent to computing device 12 may include a collection of separate data structures, each containing a vector-based description of a map element (or a portion of a map element) and metadata, and the metadata for certain map elements (e.g., a point, polyline, polygon, etc.) may indicate that the map elements are associated with flight information. As another example, in an implementation where the airport map data stored in database 50 and sent to computing device 12 includes rasterized image data, the map server 14 may send the rasterized image data to computing device 12 with one or more sets of coordinates for the raster image that correspond to an element on the map (e.g., specifying a point, line, or area on the map image), and with an indication that the map element is associated with flight information. The map element specified by the indication sent to computing device 12 corresponds to a particular airport facility. For example, an indicated map element may be a representation of a particular terminal gate, or a structure or area near the terminal gate. As another example, an indicated map element may be a representation of a particular baggage claim area, or a structure or area near the baggage claim area. In some implementations, the indication includes information identifying a particular airport facility (e.g., a gate number identifying a terminal gate, a baggage claim number identifying a baggage claim area, etc.), and/or information identifying the categories of flight information to be displayed at or near the indicated map element (e.g., scheduled arrival time, originating airport code, etc.).

In an example scenario, the computing device 12 receives the map data, along with the indication of any map elements associated with flight information. In response, the flight information module 44 generates a request for the corresponding flight information and causes the request to be sent to flight information server 16. The flight information server 16 may include a processor 72 and a memory 74 that stores a request processor 76, which is made up of instructions executable on the processor 72. The computing device 12 and the flight information server 16 may communicate in a client-server mode, similar to computing device 12 and map server 14. In operation, the request processor 76 receives the request for flight data from the computing device 12, identifies and retrieves the requisite flight data from the flight information database 70 and/or other flight information databases, formats a response message that contains the flight data, and causes the response message to be transmitted to the computing device 12 via the network 18. The flight data in flight information database 70 may be regularly updated (e.g., by flight information server 16) to reflect current flight scheduling.

Upon receiving the flight data (which may be stored locally at computing device 12 as flight data 43), the flight information module 44 may render the airport map with the real-time flight information corresponding to the received flight data at the map element(s) specified by the indication received from map server 14. The computing device 12 may periodically request updated flight information from flight information server 16, and replace the originally displayed flight information with the updated flight information. In other implementations, the flight information server 16 sends flight data to computing device 12 without receiving a request. For example, the map server 14 may, when receiving a request from computing device 12 for map data corresponding to an airport facility associated with flight information, directly send flight information server 16 a request to provide the appropriate flight data to computing device 12. In still another implementation, the map server 14 requests that the flight information server 16 send the flight data to map server 14 rather than computing device 12. In this implementation, map server 14 may forward the flight data with the corresponding map data to computing device 12 (e.g., in implementations where map server 12 sends vector graphics data to computing device 12), or may generate rasterized tiles incorporating the map data and flight data, and send the raster data (with flight information already displayed at the appropriate location(s)) to computing device 12.

In one example implementation, a web browser (e.g., a web browser for which the mapping module 40 extends the functionality) retrieves a resource, such as a web page, from a web server (e.g., map server 14) via network 18. The resource may include content such as text, images, video, interactive scripts, etc. and describe the layout and visual attributes of the content using HTML or another suitable mark-up language. Additionally, the resource requests that a portion of the browser window be allocated for display of map data and (where applicable) corresponding flight information, and provides an API for accessing the map data and/or the flight data from the computing device 12. Once the computing device 12 receives the resource, the browser displays the received content in a browser window displayed on user interface 30, allocates a portion of the window in the form of an embedded window for display of map data with flight data, and executes the API to retrieve the map data and (if applicable) flight data (e.g., from map server 14 and flight information server 16) and render the received data within the embedded window. Thus, according to this example implementation, the browser obtains map data and flight data and renders both types of data within the same window using the same API.

In some implementations, the computing device 12 allows a user to selectively enable or disable the display of real-time flight information on the airport map. For example, the mapping module 40 may provide a checkbox or menu-based control, displayed to a user via the user interface 30, for enabling or disabling the display of real-time flight information.

For simplicity, FIG. 1 illustrates the map server 14 and the flight information server 16 each as only one instance of a server device. However, the map server 14 and/or the flight information server 16, according to some implementations, each include a group of two or more server devices, each equipped with one or more processors and capable of operating independently of the other server devices. Map and/or flight information server devices operating in such a group can process requests from the computing device 12 individually (e.g., based on availability), in a distributed manner where one operation associated with processing a request is performed on one server device while another operation associated with processing the same request is performed on another server device, or according to any other suitable technique. For the purposes of this discussion, the term "server" may refer to an individual server device or to a group of two or more server devices.

Figure 2:
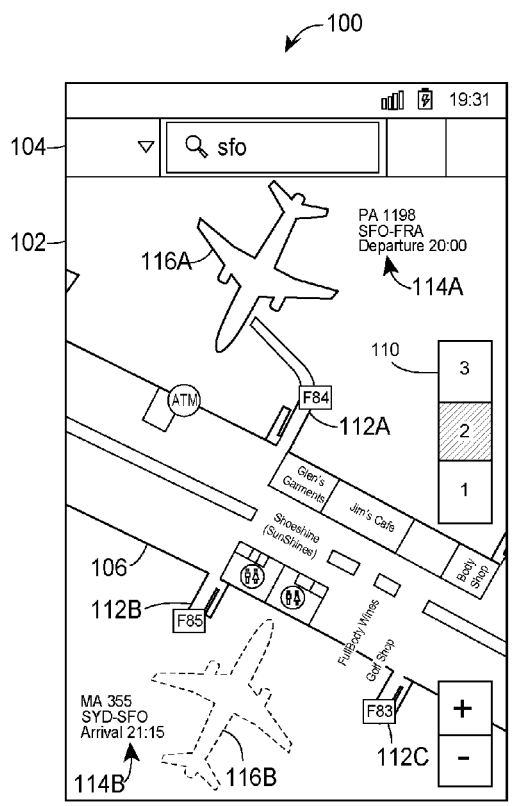
FIG. 2 is an example screenshot that illustrates the display of real-time flight information on an indoor map showing terminal gates of an airport.

In FIGS. 2-5, example screenshots illustrate the display of real-time flight information on a digital airport map. The screenshots may be displayed on a user interface of a client device, such as the user interface 30 of computing device 12 in FIG. 1, for example. Referring first to FIG. 2, an example screenshot 100 illustrates the display of real-time flight information on an indoor map showing terminal gates of an airport. A viewing area 102 displays a digital map, and a control bar 104 provides interactive user mapping functions, such as a search window for entering information identifying a location that a user wishes to view on the map. In the example screenshot 100, a user has entered "sfo" to identify San Francisco International Airport, which is then displayed in the viewing area 102. In a navigation application, the location displayed in the viewing area 102 may instead depend on the current location of the user viewing the screenshot 100. The control bar 104 may include other mapping control functions as well, such as options to display or not display certain kinds of map data (e.g., text names of physical entities, etc.), and/or a map type selector (e.g., a control to select a satellite photograph view or a schematic representation of an area), for example. Alternatively, the control bar 104 may be omitted.

The viewing area 102 of the example screenshot 100 depicts an indoor map 106 of an airport terminal building. Depending on a zoom level, and/or the geographic location at which the digital map is centered, all or only a portion of the airport terminal building may be displayed at a given time. In scenarios where the indoor map 106 corresponds to an airport terminal building with multiple stories/levels, an indicator 110 may show which level is currently being displayed. The indicator 110 may also serve as control, allowing a user to select which level to view (e.g., by touching the desired level number on a touch screen of user interface 30 in FIG. 1, etc.).

In the example implementation corresponding to the screenshot 100, the indoor map 106 depicts various structures within the airport terminal building being represented, such as interior walls of businesses and restrooms, as well as text identifiers of various locations (e.g., business names). Moreover, at certain locations and/or zoom levels, the indoor map 106 may show various facilities that are specific to airports. In the example screenshot 100, for example, the indoor map 106 depicts three terminal gates 112A-112C, along with text identifiers of the corresponding gate numbers.

At locations near terminal gates 112A and 112B, the map of the viewing area 102 depicts text-based, real-time flight information 114A and 114B, respectively. The flight information 114A and 114B may be real-time flight information retrieved from a server such as flight information server 16 of FIG. 1, for example. With reference to FIG. 1, in one example scenario and implementation where the computing device 12 displays the example screenshot 100 on the user interface 30, the computing device 12 receives from map server 14 the map data for the map shown in viewing area 102, as well as an indication that map elements corresponding to gates 112A and 112B are associated with flight information. The indication may comprise gate numbers for gates 112A and 112B (e.g., gate numbers F84 and F85, respectively), for example. In this example implementation, the computing device 12 then retrieves the appropriate real-time flight information from flight information server 16 (e.g., by requesting flight information corresponding to the indicated gate numbers), and displays the real-time flight information (114A and 114B in FIG. 2) on the user interface 30 near the respective terminal gate (112A or 112B in FIG. 2). The precise location of the real-time flight information 114A, 114B may be specified entirely by the indication received from map server 14, or may also be determined in part by the computing device 12 (e.g., by mapping module 40), in various implementations. Generally, the real-time flight information is displayed at a location that allows a user viewing the map to quickly recognize which terminal gate corresponds to the information.

In the example screenshot 100, the real-time flight information 114A corresponds to a flight scheduled to depart from the airport, and includes a flight number (which also identifies the carrier/airline), the originating and destination airport codes, and the scheduled departure time. The real-time flight information 114B corresponds to a flight scheduled to arrive at the airport, and includes a flight number, the originating and destination airport codes, and the scheduled arrival time. In other implementations, more or less flight information is displayed in the real-time flight information 114A and/or 114B. Additionally, in the example implementation corresponding to the screenshot 100, a graphic 116 of an airplane is shown at each terminal gate 112 at which a flight is scheduled to arrive of depart. The airplane graphic 116 may visually indicate to a user the current status of the flight corresponding to the gate, such that the user may easily determine the flight status by quickly scanning the map. In the example screenshot 100, the airplane graphic 116A is a representation of an airplane using solid lines, with some low level of detail in addition to the outline of the aircraft. This particular graphic may represent that the flight corresponding to gate 112A is currently boarding, and/or that the flight is on track for its originally scheduled departure, for example. Conversely, the airplane graphic 116B is a dotted-outline representation of an airplane to indicate that the flight corresponding to gate 112B has not yet arrived. The airplane graphics 112A, 112B may be selected by a client device (e.g., flight information module 44 of computing device 12 in FIG. 1) based on a current flight status included in real-time flight information (e.g., flight information retrieved from flight information server 16 in FIG. 1), for example.

Terminal gates at which no flight is currently scheduled for arrival or departure, or at which no departures/arrivals are scheduled within a particular time frame (e.g., 24 hours), may not show any corresponding real-time flight information (and/or any airplane graphic) on the map. In the example screenshot 100, for example, the map does not display any real-time flight information or any airplane graphic near terminal gate 112C.

Figure 3:
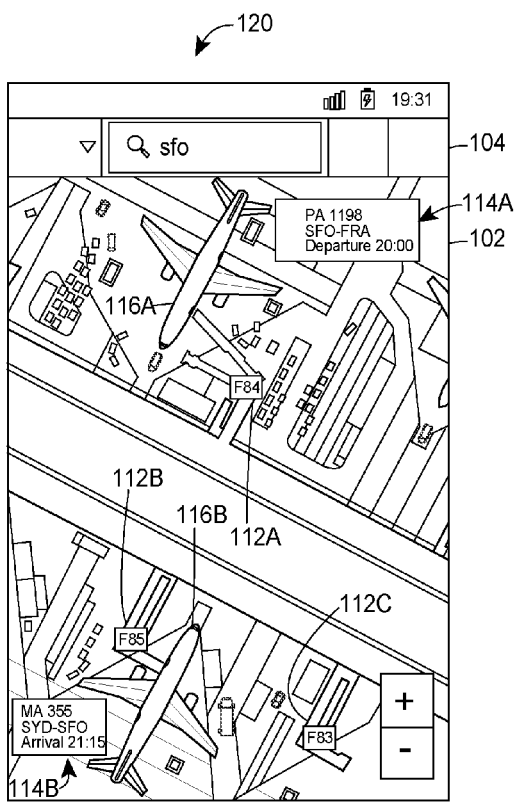
FIG. 3 is an example screenshot that illustrates the display of real-time flight information on a satellite map showing terminal gates of an airport.

In some implementations, the airport map displayed in viewing area 102 is a satellite photograph rather than a schematic representation, or a combination of a satellite photograph overlaid with schematic elements. FIG. 3 represents an example screenshot 120 in which the digital map includes one or more satellite photographs rather than a schematic representation, and the interior details of the airport terminal building are therefore concealed. As seen in FIG. 3, however, the terminal gates 112A-112C are still visible on the airport map, and a text identifier of a gate numbers is still included to identify each gate. Moreover, real-time flight information 114 is still overlaid on the map. While the flight information 114 is shown in FIG. 3 within boxes that overlay the map, other implementations overlay the text directly on the map, preferably using a color/brightness/etc. that provides a strong contrast to the satellite photograph.

Because the map in the viewing area 102 of the example screenshot 120 is a satellite photograph taken at some arbitrary point in time, airplanes may or may not be seen at the various terminal gates 112, regardless of the status of any flights scheduled to arrive at or depart from the corresponding gates. In some implementations, however, airplane graphics such as graphics 116A and 116B in FIG. 2 are overlaid on the satellite photograph to visually indicate a current status of a flight. The airplane graphics may conceal or partially conceal any airplanes included in the satellite photograph, in some scenarios.

Figure 4C:
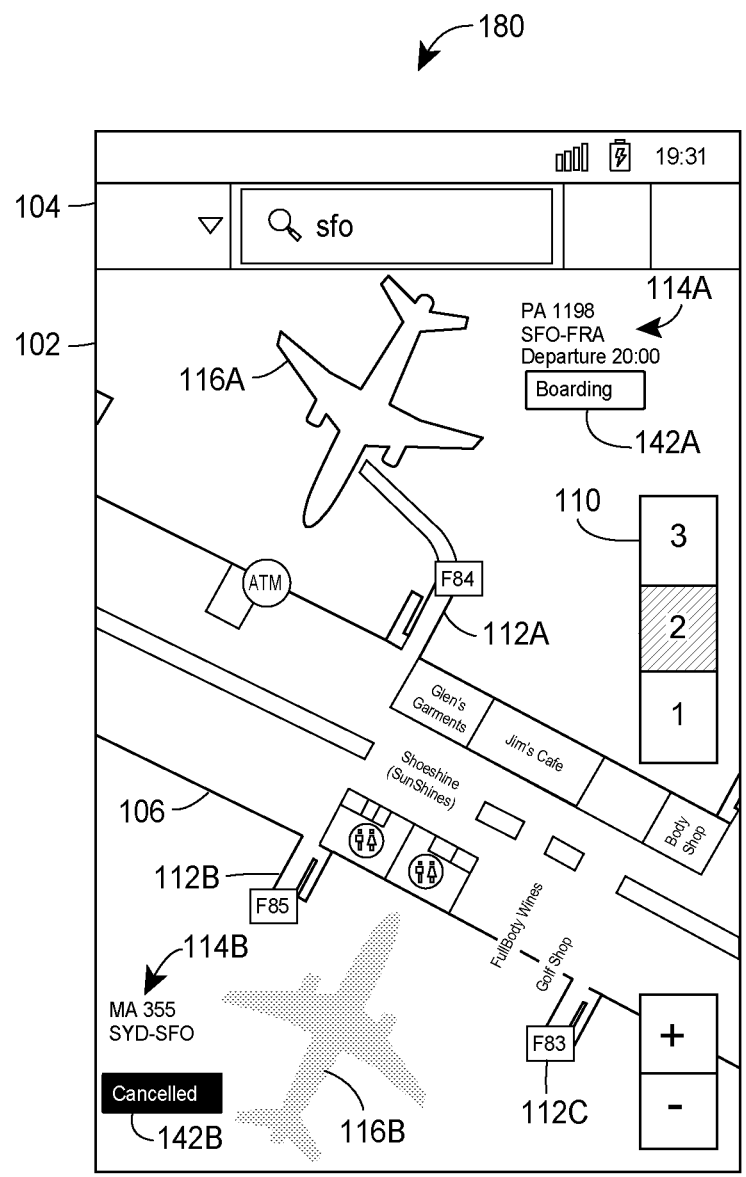

In some implementations, the current status of a flight is displayed as text in addition to, or instead of, displaying an airplane graphic indicating the current status. FIGS. 4A-4C illustrate example screenshots corresponding to various flight status scenarios. Referring first to FIG. 4A, an example screenshot 140 displays, next to the other flight information 114, a current status 142 of a flight scheduled to arrive at, or depart from, a particular terminal gate 112. Specifically, in the example scenario of FIG. 3, a "Boarding" status is displayed for the flight scheduled to depart from the terminal gate 112A (i.e., gate "F84") to indicate that boarding is underway, and a "Scheduled" status is displayed for the flight scheduled to arrive at the terminal gate 112B (i.e., gate "F85") to indicate that the flight is still on track to arrive at its originally scheduled time of 21:15. In a different scenario, corresponding to the example screenshot 160 of FIG. 4B, the current status 142B of the flight scheduled to arrive at terminal gate 112B is instead "Delay 1 hr," to indicate that the flight is expected to arrive one hour after its originally scheduled arrival time. In still another scenario, corresponding to the example screenshot 180 of FIG. 4C, the current status 142B of the flight scheduled to arrive at terminal gate 112B is "Cancelled," to indicate that the flight has been cancelled and is no longer expected to arrive at gate 112B.

In some implementations and scenarios, real-time flight information is displayed in connection with airport facilities other than terminal gates. For example, FIGS. 5A and 5B illustrate example screenshots in which real-time flight information is displayed at locations on an airport map that correspond to baggage claim areas. Referring first to FIG. 5A, an example screenshot 200 shows an area of the indoor map 106 of the airport terminal building (now on level one rather than level two, as indicated by the indicator 110) that includes four baggage claim carousels 202A-202D. In the example scenario of FIG. 5A, the carousel 202C is associated with real-time flight information 204. The real-time flight information 204 includes a flight number of the flight delivering (or scheduled to deliver) baggage to carousel 202C, and the originating airport of the flight. In other implementations, more or less real-time flight information (e.g., arrival time, etc.) is included in flight information 204. In the example implementation of FIG. 5A, a current status 206 is also displayed with the real-time flight information 204. In the example screenshot 200, the status 206 is "starting in 5 min" to indicate that the carousel is expected to begin delivering bags from the identified flight in five minutes. In the example screenshot 220 of FIG. 5B, the status 206 is instead "Delivering," to indicate that the carousel is currently delivering bags from the identified flight. A client device displaying the map of FIG. 5A or FIG. 5B (e.g., computing device 12 of FIG. 1) may determine that the carousel 202C is associated with flight information, and/or determine the precise location at which real-time flight information should be displayed, in a manner similar to that described above with reference to the terminal gates of FIG. 2.

The real-time flight information displayed near the terminal gates of FIGS. 2-4 and the baggage claim carousel of FIGS. 5A and 5B may be updated in any suitable manner to accurately reflect current scheduling information. In one implementation, for example, a client device displaying the example screenshots of FIGS. 2-5 (e.g., computing device 12 of FIG. 1) periodically queries a server (e.g., flight information server 16 of FIG. 1) for updated flight information. In another example implementation, the client device only initially requests the flight information from the server. In this implementation, the server sends the requested real-time flight information to the client device, and then automatically sends the client device a notification of any changes to the flight information. In implementations where the client device receives rasterized data for images that already include both map and flight information, updated raster images/tiles may be received from a server (e.g., map server 14 of FIG. 1) automatically, or in response to queries from the client device.

To further illustrate techniques for providing a display of real-time flight information on an airport map, example methods which the mapping module 40 of FIG. 1 may implement (e.g., in whole or in part using flight information module 44) are discussed next with reference to FIGS. 6 and 7. More generally, these methods can be implemented in any suitable computing device using any suitable software application. For example, these methods can be implemented as sets of instructions that are stored on a computer-readable medium (e.g., memory 24 of FIG. 1) and are executable on a processor (e.g., CPU 20 and/or GPU 22 of FIG. 1).

Figure 6:
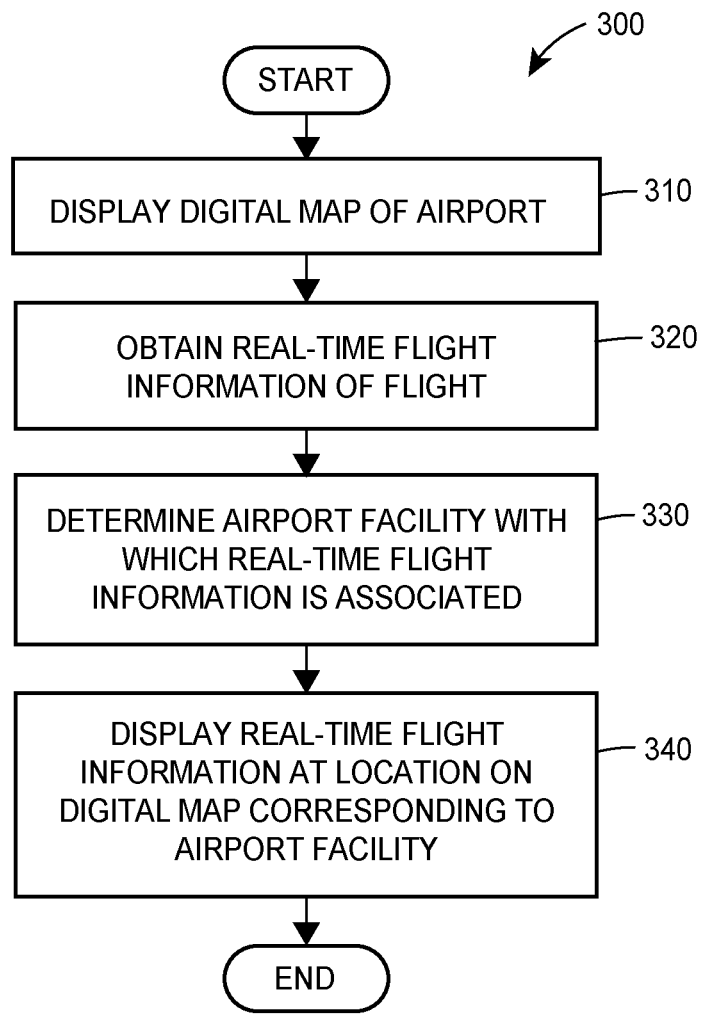
FIG. 6 is a flow diagram of an example method for displaying real-time flight information on a user interface of a client device.

The flow diagram of FIG. 6 illustrates an example method 300 for displaying real-time flight information on a user interface of a client device, such as user interface 30 of computing device 12 in FIG. 1. At block 310, a digital map of an airport is displayed via the user interface. The digital map may portray the entire airport, or a portion of the airport, and may include a schematic representation and/or one or more satellite photographs. In some implementations or scenarios, the digital map includes an indoor map, showing interior portions of an airport terminal building. The map may include textual labels for certain structures portrayed on the map, such as a name of the airport, names of streets near the airport, names of businesses within the airport, gate numbers of terminal gates, etc.

At block 320, real-time flight information of a flight that is scheduled to depart from or arrive at the airport displayed in the digital map is obtained. The real-time flight information may include information such as a flight number, a scheduled arrival or departure time, and/or originating and/or destination airport, for example. In some implementations, the real-time flight information also (or instead) includes a current status, such as a current status of a flight (e.g., whether the flight is currently boarding, is delayed, is on schedule, or is cancelled) and/or a current baggage delivery status associated with the flight (e.g., whether baggage is currently being delivered or has stopped being delivered, or when baggage delivery is expected to begin).

In one implementation, a client device (e.g., computing device 12 of FIG. 1) obtains the real-time flight information by requesting the flight information from a server (e.g., flight information server 16 in FIG. 1). In other implementations, the real-time flight information is sent by a server automatically, without a request from a client device. Moreover, the real-time flight information may be obtained from multiple sources. For example, real-time flight information pertaining to a flight scheduled to arrive at a particular gate (e.g., flight number, arrival time, originating airport, current status of the flight, etc.) may be obtained from a first server, while real-time flight information pertaining to the baggage carried on the flight (e.g., a baggage delivery time) may be obtained from a second server at a different location.

At block 330, an airport facility with which the real-time flight information (obtained at block 320) is associated is determined. For example, in one scenario, it may be determined that a particular terminal gate is associated with the obtained flight information. As another example, it may be determined that a particular baggage claim area is associated with the obtained flight information. The determination at block 330 may be made in various ways, according to different implementations. In one implementation, for example, a device performing the method 300 knows a priori that a particular airport facility is associated with flight information (e.g., based on metadata included in map data used to generate the digital map displayed at block 310), and therefore generates a request for flight information associated with that airport facility. According to this implementation, the determination at block 330 is made by determining that the obtained flight information was received in response to the generated request. In another example implementation, the device performing the method 300 requests flight information for a plurality of flights, and determines which airport facility corresponds to which flight information based on known identifiers of the airport facilities (e.g., gate numbers, baggage claim numbers, etc. included in metadata in the map data).

In some implementations, the type of real-time flight information obtained at block 320 depends on which type of airport facility the information is associated with. For example, a flight number, carrier name, departure or arrival time, destination airport identifier, originating airport identifier, and/or flight status may be obtained at block 320 if the airport facility determined at block 330 is a terminal gate. As another example, a flight number, carrier name, arrival time, originating airport, and/or baggage delivery status may be obtained at block 320 if the airport facility determined at block 330 is a baggage claim area.

At block 340, the real-time flight information obtained at block 320 is displayed at a location on the digital map that corresponds to the airport facility determined at block 330. The real-time flight information may be displayed directly over the representation of the airport facility on the map, for example, or may be displayed at a location on the map that is near the airport facility and easily recognizable to a viewer as being associated with the airport facility (e.g., similar to the flight information shown in the example screenshots of FIGS. 2-5). In some implementations, the real-time flight information is overlaid on the digital map.

While the blocks of the method 300 are shown in sequential order, the blocks may occur in a different order, and/or overlap in time, in other implementations. For example, block 310 may occur after block 320, and/or may occur at the same time as block 340. Moreover, the method 300 may include additional blocks not shown. For example, the method 300 may include a block, before block 310, in which map data is obtained (e.g., from a server such as map server 12 of FIG. 1), where the map data represents the digital map displayed at block 310. As another example, the method 300 may include additional blocks, after block 340, in which updated real-time flight information for the flight is obtained, and in which the updated flight information is displayed at the same location at which real-time flight information was displayed at block 340. The updated flight information may be displayed in place of some or all of the flight information displayed at block 340, for example.

As yet another example, in a scenario where the airport facility is a baggage claim area (e.g., a carousel), the method 300 may include additional blocks in which it is determined that the real-time flight information obtained at block 320 indicates baggage is currently being delivered, and in which a graphic depicting baggage is displayed at or near the baggage claim area on the digital map (e.g., as shown for baggage claim carousel 202C in FIG. 5B) in response to that determination.

As still another example, in a scenario where the airport facility is a terminal gate, the method 300 may include an additional block in which an airplane graphic is displayed at the terminal gate on the digital map. The airplane graphic may indicate a current status of the flight (e.g., boarding, delayed, etc.) corresponding to the particular airplane graphic displayed. In one scenario, for example, a module such as flight information module 44 in FIG. 1 may determine that a flight is at the terminal gate based on the real-time flight information obtained at block 320, and in response select a first airplane graphic corresponding to that status (e.g., as shown for gate 112A in FIG. 4A). In another example scenario, the module may determine that a flight is scheduled to arrive at the terminal gate at a future time based on the real-time flight information obtained at block 320, and in response select a second airplane graphic corresponding to that status (e.g., as shown for gate 112B in FIG. 4B). In yet another example scenario, the module may determine that a flight has been cancelled based on the real-time flight information obtained at block 320, and in response select a third airplane graphic corresponding to that status (e.g., as shown for gate 112B in FIG. 4C).

Figure 7:
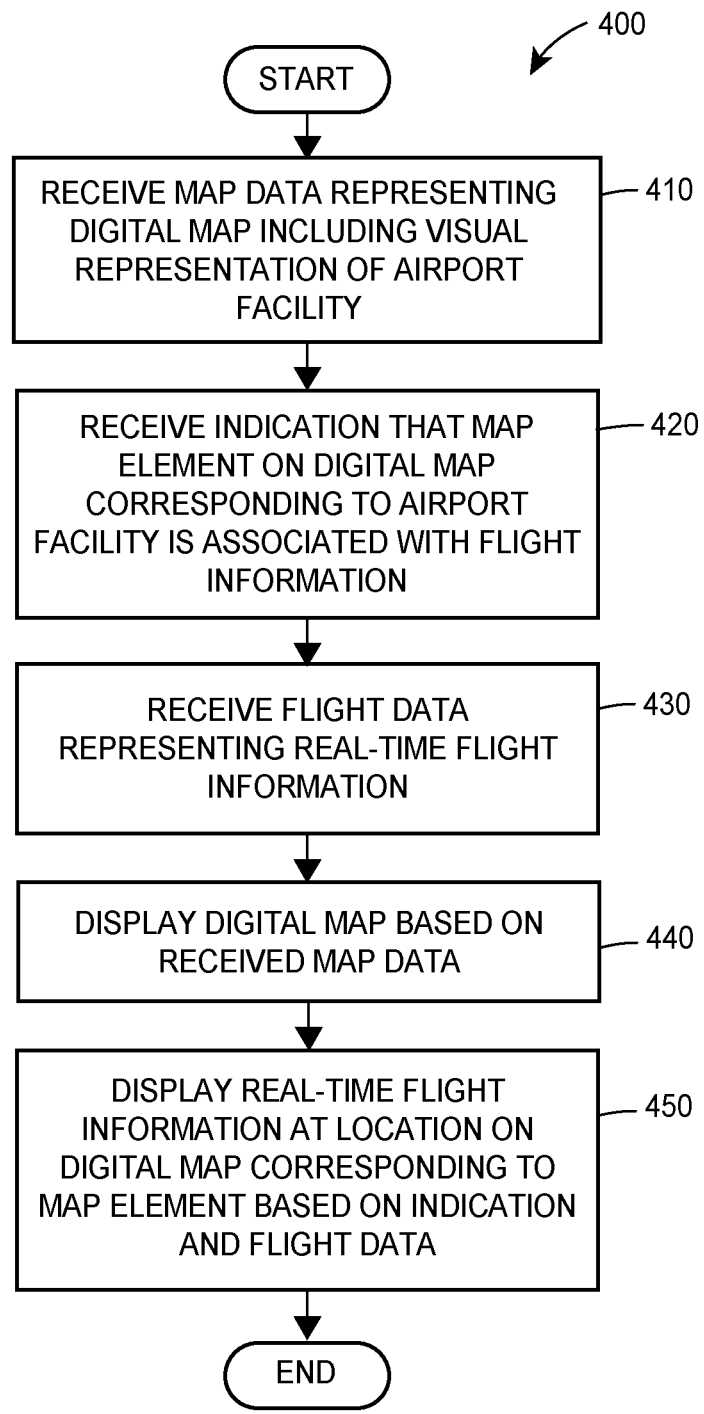
FIG. 7 is a flow diagram of another example method for displaying real-time flight information on a user interface of a client device.

FIG. 7 is a flow diagram of another example method 400 for displaying real-time flight information on a user interface of a client device, such as user interface 30 of computing device 12 in FIG. 1. The method 400 is more specifically directed to data handling associated with the display of real-time flight information on an airport map, according to an implementation, and may be performed in order to effect the method 300 of FIG. 6, for example.

At block 410, map data representing a digital map is received. The map data may be in a vector graphics format, or in a raster format, for example. The digital map includes a visual representation of an airport facility, such as a terminal gate or baggage claim area. The airport facility may be shown as a part of an indoor map of an airport, for example, or as a part of a satellite photograph of an airport (e.g., a terminal gate structure shown in the photograph). The digital map may be similar to the digital map displayed in block 310 of method 300 in FIG. 6, for example. The map data may be received from a server such as map server 14 of FIG. 1, for example. In some implementations, the map data is received in response to a query from a client device performing the method 400. For example, the map data may be received in response to a client device requesting map data after a user of the client device uses a mapping application to pan and/or zoom to a particular geographic location that includes the airport facility. As another example, the map data may be received in response to a client device requesting location services after a user has moved into an area that is at or near the airport facility (e.g., while the client device is running a navigation application).

At block 420, an indication that a map element on the digital map corresponding to the airport facility is associated with flight information is received. The map element may be an element that represents the airport facility shown on the digital map (e.g., a polyline or polygon used to depict a terminal gate or baggage claim carousel), or represents a location near to the airport facility (e.g., a "blank" area on the map representing open floor space near the airport facility). The indication received at block 420 may be included in metadata associated with the map data representing the map element, for example, and/or may include information identifying the airport facility. In one implementation, for example, the indication includes an identifier corresponding to the airport facility, such as a gate number or baggage claim area number.

At block 430, flight data representing real-time flight information of a flight scheduled to utilize the airport facility is received. For example, the real-time flight information may be information for a flight that is scheduled to arrive at or depart from a particular terminal gate, or an arriving flight scheduled to deliver baggage to a particular baggage claim area. The real-time flight information includes currently scheduled information pertaining to the airport facility associated with the indicator received at block 420. For example, if the airport facility is a terminal gate, the real-time flight information may include a flight number of the next flight scheduled to depart from or arrive at the gate, the destination and/or originating airport code for the flight, the scheduled arrival or departure time for the flight, and/or a current status of the flight (e.g., boarding, on schedule, delayed, cancelled, etc.). As another example, if the airport facility is a baggage claim area such as a carousel, the real-time flight information may include a flight number of the next flight scheduled to deliver baggage to the baggage claim area (or a flight currently delivering baggage to the baggage claim area), the destination and/or originating airport code for the flight, the scheduled arrival time for the flight, a current status of the flight (e.g., on schedule, delayed, cancelled, etc.), and/or a current status of baggage delivery (e.g., delivering, starting in 10 minutes, complete, etc.).

In one implementation, the flight data is received from a server (e.g., flight information server 16 of FIG. 1) in response to a query from a client device implementing the method 400 (e.g., computing device 12 of FIG. 1). For example, the client device may have received (at block 420) an indication that includes a gate number, and then generated and sent a request for real-time flight information corresponding to that gate number. In another implementation, the flight data is received from the server without any request from the client device (e.g., in response to a request from another server, such as map server 14).

At block 440, the digital map is displayed, via a user interface of the device implementing the method 400, based on the map data received at block 410. The procedures involved in displaying the digital map may depend on whether the received map data is in a vector graphics format or a raster format, as described in further detail above in connection with FIG. 1.

At block 450, the real-time flight information is displayed at a location on the digital map, via the user interface of the device implementing the method 400, based on the indication and flight data received at blocks 420 and 430. For example, the received flight data may be used to generate the substance (e.g., text, airplane graphic, etc.) of the flight information display, and the received indication may be used to determine the location of the flight information on the digital map. For example, the location of the displayed flight information may be tied to the map element associated with the received indication. In one implementation, for example, the real-time flight information is displayed at or near (e.g., a predetermined map distance from) the map element. In another example implementation, the location is also determined in part by the client device. For example, a module within the client device (e.g., mapping module 40 of FIG. 1) may automatically determine a location on the displayed digital map that is near the map element, but causes minimal overlap between the flight information and any other text and/or shapes on the map. The real-time flight information is preferably displayed such that a viewer of the digital map can quickly and easily determine that the flight information corresponds to the airport facility.

While the blocks of the method 400 are shown in sequential order, the blocks may occur in a different order, and/or overlap in time, in other implementations. For example, block 430 may occur after block 440, and/or blocks 440 and 450 may occur at the same time. Moreover, the method 400 may include additional blocks not shown. For example, the method 400 may include a block, somewhere between blocks 430 and 450, in which it is determined that the flight data received at block 430 is associated with the airport facility (e.g., in a manner similar to that described above in connection with block 330 of method 300 in FIG. 6). As another example, the method 400 may include additional blocks, after block 450, in which additional flight data representing updated real-time flight information for the flight is received, and in which the updated flight information is displayed, via the user interface and based on the additional flight data, in place of some or all of the flight information displayed at block 450. As yet another example, the method 400 may include additional blocks for displaying an airplane graphic when the airport facility is a terminal gate, or for displaying a baggage graphic when the airport facility is a baggage claim area, where the airplane or baggage graphic indicates a current status of the flight or baggage delivery, respectively. The selection and display of an airplane or baggage graphic may be similar to that described above in connection with the method 300 of FIG. 6, for example.

In one implementation, the map data is received at block 410, and/or the indication is received at block 420, from a first server (e.g., map server 14 of FIG. 1) in response to a first query from a client device performing the method 400 (e.g., a query generated by a mapping or navigation application), and the flight data is received at block 420 from a second server (e.g., flight information server 16 in FIG. 1) in response to a second query from the client device. In this implementation, the second query may be generated in response to receiving the indication at block 420.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one implementation" or "an implementation" means that a particular element, feature, structure, or characteristic described in connection with the implementation is included in at least one implementation. The appearances of the phrase "in one implementation" in various places in the specification are not necessarily all referring to the same implementation.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for displaying real-time flight information on a digital airport map through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for displaying real-time flight information on a user interface of a client device executing a mapping software module, the method comprising:
  sending, from the client device to a map server, a request corresponding to a geographic area at which an airport is located, wherein the request is generated by the mapping software module based on a user entry made via the user interface, and wherein the user entry includes a panning or zooming input made with respect to an initial map displayed via the user interface;

in response to sending the request, receiving, at the client device from the map server, (i) map data representing a map of the airport, and (ii) metadata indicating that a particular location on the map is associated with flight-related information, wherein the particular location corresponds to an airport facility;

using, by the client device, the map data to display a digital map of the airport via the user interface;

using, by the client device, the metadata to obtain, from a remote server different than the map server, real-time flight information of a flight scheduled to depart from, or arrive at, the airport; and displaying, via the user interface, the real-time flight information at a location on the digital map corresponding to the particular location.

2. The method of claim 1, wherein using the map data to display a digital map of the airport includes using the map data to display a digital indoor map of the airport.

3. The method of claim 1, wherein receiving metadata indicating that a particular location on the map is associated with real-time flight information includes receiving metadata indicating that a location of a particular terminal gate is associated with real-time flight information.

4. The method of claim 3, wherein the real-time flight information includes at least one selected from a group consisting of:
a flight number of the flight,
a name of a carrier of the flight,
a departure time of the flight,
an arrival time of the flight,
an identifier of a destination airport of the flight, and
an identifier of an originating airport of the flight.

5. The method of claim 4, wherein:
the real-time flight information further includes a current status of the flight, and
the current status of the flight indicates at least one selected from a group consisting of
whether the flight is currently boarding,
whether the flight is delayed,
whether the flight is on schedule, and
whether the flight is canceled.

6. The method of claim 3, further comprising:
displaying an airplane graphic at the terminal gate, wherein the airplane graphic indicates a current status of the flight.

7. The method of claim 6, wherein displaying the airplane graphic at the terminal gate comprises:
displaying a first airplane graphic at the terminal gate when the real-time flight information indicates the flight is at the terminal gate;
displaying a second airplane graphic at the terminal gate when the real-time flight information indicates the flight is scheduled to arrive at the terminal gate at a future time; and
displaying a third airplane graphic at the terminal gate when the real-time flight information indicates the flight has been cancelled.

8. The method of claim 1, wherein receiving metadata indicating that a particular location on the map is associated with real-time flight information includes receiving metadata indicating that a location of a particular baggage claim area is associated with real-time flight information.

9. The method of claim 8, wherein the real-time flight information includes at least one selected from a group consisting of:
a flight number of the flight,
a name of a carrier of the flight,
an arrival time of the flight, and
an identifier of an originating airport of the flight.

10. The method of claim 9, wherein:
the real-time flight information further includes a current baggage delivery status associated with the flight, and
the current baggage delivery status indicates at least one selected from a group consisting of
whether baggage is currently being delivered,
whether baggage has stopped being delivered, and
when baggage delivery is expected to begin.

11. The method of claim 1, further comprising:
obtaining, from the remote server, updated real-time flight information of the flight scheduled to depart from, or arrive at, the airport; and
displaying the updated real-time flight information at the location on the digital map corresponding to the particular location in place of at least a portion of the real-time flight information.

12. A non-transitory computer-readable medium storing instructions thereon for displaying real-time flight information on a user interface of a client device, wherein the instructions, when executed on one or more processors of the client device, cause the client device to:
generate a request corresponding to a geographic area at which an airport is located based on (i) a user entry made via the user interface, and wherein the user entry includes a panning or zooming input made with respect to an initial map displayed via the user interface;
send, to a map server, the request;
in response to sending the request, receive, from the map server, (i) map data representing a map of the airport, and (ii) metadata indicating that a particular location on the map is associated with flight-related information, wherein the particular location corresponds to an airport facility;
use the map data to display a digital map of the airport via the user interface;
use the metadata to obtain, from a remote server different than the map server, real-time flight information of a flight scheduled to depart from, or arrive at, the airport; and
display, via the user interface, the real-time flight information at a location on the digital map corresponding to the particular location.

13. The non-transitory computer-readable medium of claim 12, wherein the digital map of the airport includes a digital indoor map of the airport.

14. The non-transitory computer-readable medium of claim 12, wherein the particular location on the map is a location of a particular terminal gate.

15. The non-transitory computer-readable medium of claim 14, wherein the real-time flight information includes at least one selected from a group consisting of:
a flight number of the flight,
a name of a carrier of the flight,
a departure time of the flight,
an arrival time of the flight,
an identifier of a destination airport of the flight, and
an identifier of an originating airport of the flight.

16. The non-transitory computer-readable medium of claim 15, wherein:
the real-time flight information further includes a current status of the flight, and
the current status of the flight indicates at least one selected from a group consisting of
whether the flight is currently boarding,
whether the flight is delayed, whether the flight is on schedule, and
whether the flight is canceled.

17. The non-transitory computer-readable medium of claim 14, wherein the instructions further cause the client device to:
   display an airplane graphic at the terminal gate, wherein the airplane graphic indicates a current status of the flight.

18. The non-transitory computer-readable medium of claim 17, wherein the airplane graphic at the terminal gate comprises:
   a first airplane graphic at the terminal gate when the real-time flight information indicates the flight is at the terminal gate;
   a second airplane graphic at the terminal gate when the real-time flight information indicates the flight is scheduled to arrive at the terminal gate at a future time; and
   a third airplane graphic at the terminal gate when the real-time flight information indicates the flight has been cancelled.

19. The non-transitory computer-readable medium of claim 12, wherein the particular location on the map is a location of a particular baggage claim area.

20. The non-transitory computer-readable medium of claim 19, wherein:
   the real-time flight information includes a current baggage delivery status associated with the flight, and
   the current baggage delivery status indicates at least one selected from a group consisting of
      whether baggage is currently being delivered,
      whether baggage has stopped being delivered, and
      when baggage delivery is expected to begin.

* * * * *